United States Patent [19]

Imataki

[11] Patent Number: 5,682,375
[45] Date of Patent: Oct. 28, 1997

[54] INFORMATION RECORDING MEDIUM AND METHOD FOR RECORDING AND REPRODUCING THEREOF

[75] Inventor: Hiroyuki Imataki, Yokohama, Japan

[73] Assignee: Canon Kabushiki Kaisha, Tokyo, Japan

[21] Appl. No.: 505,912

[22] Filed: Jul. 24, 1995

[30] Foreign Application Priority Data

Jul. 25, 1994 [JP] Japan .................................. 6-172482

[51] Int. Cl.⁶ .................................................. G11B 7/24
[52] U.S. Cl. .................... 369/275.4; 369/277; 369/278; 369/54; 369/100
[58] Field of Search ...................... 369/275.4, 275.3, 369/277, 276, 278, 54, 58, 53, 47, 32, 44.26, 100

[56] References Cited

U.S. PATENT DOCUMENTS

| | | | |
|---|---|---|---|
| 4,893,298 | 1/1990 | Pasman et al. | 369/275.4 |
| 4,925,733 | 5/1990 | Imataki et al. | 428/336 |
| 4,956,214 | 9/1990 | Imataki et al. | 428/64 |
| 4,965,153 | 10/1990 | Imataki et al. | 430/11 |
| 5,026,623 | 6/1991 | Imataki et al. | 430/270 |
| 5,073,101 | 12/1991 | Imataki et al. | 425/383 |
| 5,075,060 | 12/1991 | Imataki | 264/167 |
| 5,085,925 | 2/1992 | Hiraoka et al. | 428/215 |
| 5,115,424 | 5/1992 | Nakajima et al. | 369/275.4 |
| 5,158,859 | 10/1992 | Imatake et al. | 430/271 |
| 5,173,391 | 12/1992 | Hiraoko et al. | 430/200 |
| 5,216,665 | 6/1993 | Imataki | 369/279 |
| 5,234,633 | 8/1993 | Imataki et al. | 264/1.3 |
| 5,389,313 | 2/1995 | Imataki et al. | 156/643 |
| 5,423,671 | 6/1995 | Imataki | 425/327 |
| 5,459,712 | 10/1995 | Sugaya et al. | 369/275.4 |

FOREIGN PATENT DOCUMENTS

| | | |
|---|---|---|
| 0376678 | 7/1990 | European Pat. Off. . |
| 64-23434 | 1/1989 | Japan . |
| 2-203441 | 2/1989 | Japan . |
| 2-257444 | 10/1990 | Japan . |
| 6-012702 | 6/1992 | Japan . |
| 5-114173 | 5/1993 | Japan . |

OTHER PUBLICATIONS

European Search Report dated Oct. 30, 1995.

*Primary Examiner*—Muhammad N. Edun
*Attorney, Agent, or Firm*—Fitzpatrick, Cella, Harper & Scinto

[57] ABSTRACT

Disclosed herein is an information recording medium to be illuminated with an optical radiation beam, comprising a substrate having a surface provided with a preformat comprising a servo track and forming a sectional shape, in transverse to the track, which comprises a concavity provided between two convexities, each having a flat top, and a light reflecting layer being formed by application of a coating liquid over the surface of the substrate, wherein the concavity has the sectional shape of an open trapezoid having a rectangular part, the trapezoidal part has a pair of parallel opposite sides and a pair of sloping sides constituting walls of the trapezoidal part, one of the parallel sides constituting the bottom of the trapezoidal part being shorter than the opposite side, and the rectangular part is adjacent to the side constituting the bottom of the trapezoidal part.

50 Claims, 5 Drawing Sheets

INFORMATION RECORDING MEDIUM AND METHOD FOR RECORDING AND REPRODUCING THEREOF

BACKGROUND OF THE INVENTION

1. Field of the Invention

The present invention relates to an information recording medium on which information is stored and/or reproduced.

2. Related Background Art

In recent years, in information recording media having high recording density, vigorous research and development of optical recording media, such as optical discs, optical cards, etc. have been made. Examples of these optical recording media include media of the reproduction-only type such as compact discs (CD) and media capable of additionally writing information and/or erasing information, such as CD-R and magnetooptical discs.

In the case of a reproduction-only type optical recording media, the quality of information is affected by the structure of information formed in a substrate. For example, in the case of an optical recording medium in which information is recorded in the form of concavities and convexities, and the information is reproduced by using their phase differences, information signals to be detected are affected by the three-dimensional forms of the concavities and convexities. The optical recording media capable of additionally recording and/or erasing also has tracking grooves for recording, erasing and reproduction of information, and preformed pits which correspond to format information, such as addresses for data management and synchronizing signals in a substrate (hereinafter the information performed in the substrate, including tracking grooves and preformed pits, will be referred to as "preformat").

As methods for forming a recording layer of such an optical recording medium, there have been known a method making use of a vapor phase deposition process, such as vacuum deposition or sputtering, and a method of applying a coating liquid (hereinafter referred to as "wet coating method"). In particular, the method of forming a recording layer by a wet coating method is a method attracting attention because it makes it possible to form the recording layer at low cost. In this case where a recording layer is provided by a wet coating method on a substrate in which a preformat such as tracking grooves and preformed pits has been formed, however, a coating liquid collects in the concavities, and so the resulting coating film becomes uneven in thickness. In the case where a recording layer containing a coloring matter has been provided on a substrate by a wet coating method, the surface of the substrate and the concavities in the substrate differ from each other in the thickness of the recording layer, and therefore also differ in reflectance in some cases. In the case where a recording layer is provided on a substrate having a conventional preformat which has been provided on the premise that a recording layer is formed so as to be able to obtain the same reflectance at the concavity and at the convex, sufficient contrast cannot be obtained.

In order to solve such a problem, the present applicant has disclosed, in Japanese Patent Application Laid-Open Nos. 1-23434 and 2-257444, information recording media by which excellent contrast can be provided even when a recording layer is formed by the wet coating method. In particular, the present applicant has disclosed, in the latter application, an information recording medium which achieves high contrast by using the characteristics of the recording layer formed by the wet coating method, specifically that a recording layer is formed thicker at a concavity of the preformat than at a convexity adjacent thereto as illustrated in FIG. 5A, and improving the sectional shape of the concave preformat. However, this information recording medium tends to cause scattering of contrast in reproducing signals of information stored between the central portion and peripheral portion of its recording region.

In particular, when the preformat of the peripheral portion of the recording region is reproduced, a reproducing signal having a waveform with a W-shaped pattern as illustrated in FIGS. 5A and 5B may be obtained. Such a pattern makes the contrast worse. Although the reason why such a signal pattern is observed is not clearly understood, it is believed to be attributed to the fact that a sufficient amount of material for forming a light reflecting layer is not filled in the concavity of the preformat under the circumstances that the recording layer is formed thinner at the peripheral portion of the recording region than at the central portion of the recording region, and so the thickness of the recording layer at the bottom of the preformat concavity becomes thinner than a thickness for which the light reflecting layer will show a minimum reflectance.

Although such a problem can be solved to some extent, for example, by strictly controlling drying conditions, scattering of contrast in reproduction signals may be caused by a delicate variation in the conditions. In addition, such strict control of drying conditions also increases the cost of such an information recording medium.

SUMMARY OF THE INVENTION

In view of the above prior art, an object of the present invention is to provide an information recording medium which can provide consistent signals that are excellent in contrast over its overall recording region, and a method for recording and reproducing thereof.

According to an aspect of the present invention, there is provided an information recording medium to be illuminated with an optical radiation beam, comprising: a substrate having a surface provided with a preformat comprising a servo track and forming a sectional shape, transverse to the track, which comprises a concavity provided between two convexities, each having a flat top, and a light reflecting layering being formed by application of a coating liquid over the surface of the substrate, wherein the concavity has a sectional shape having an open trapezoid with a rectangular part, the trapezoidal part having a pair of parallel opposite sides and a pair of sloping sides constituting walls of the trapezoidal part, one of the parallel sides constituting the bottom of the trapezoidal part being shorter than the opposite side, the rectangular part being adjacent to the side constituting the bottom of the trapezoidal part.

According to another aspect of the present invention, there is provided an information recording-reproducing method, comprising illuminating an information recording medium with an optical radiation beam having a wavelength $\lambda$ to effect recording or reproduction of information; the information recording medium comprising: a substrate having a surface provided with a preformat comprising a track and forming a sectional shape, transverse to the track, which comprises a concavity provided between two convexities, each having a flat top, and a light reflecting layer being formed by application of a coating liquid over the surface of the substrate, wherein the concavity has a sectional shape having an open trapezoid with a rectangular part, the trapezoidal part having a pair of parallel opposite sides and a pair of sloping sides constituting walls of the trapezoidal part, one of the parallel sides constituting the bottom of the trapezoidal part being shorter than the opposite side, the rectangular part being adjacent to the side constituting the bottom of the trapezoidal part.

According to still another aspect of the present invention, thee is provided an information recording medium to be illuminated with an optical radiation beam, comprising: a substrate having a surface provided with tracking grooves, the tracking grooves being separated from each other by a recording track which has a flat surface, and a light reflecting layer formed by application of a coating liquid over the surface of the substrate, wherein each tracking grooves has a sectional shape, transverse to the tracking groove direction, having an open trapezoid with a rectangular part, the trapezoidal part having a pair of parallel opposite sides and a pair of sloping sides constituting walls of a groove, one of the parallel sides constituting the bottom of the trapezoidal part being shorter than the opposite side, the rectangular part being adjacent to the side constituting the bottom of the trapezoidal part.

The present inventor has carried out an investigation as to the above-described problems involved in the prior ar. As a result, it has been found that when the sectional shape of a concave preform is that of an open trapezoid having a rectangular part, and the trapezoidal part is a reversed trapezoid such that the upper side thereof is longer than the lower side thereof, and the rectangular part adjoins the lower side of the trapezoidal part, a high quality information recording medium, in which variation in contrast is small even when drying conditions fluctuate, can be provided. Although the reason why this sectional shape provides the above-described effect is not clearly understood, it is believed to be attributed to the fact that a sufficient width, in the transverse direction to the recording track, of a light reflecting layer having a thickness showing a minimum reflectance in the concavity of the preformat, the formation which has heretofore been dependent upon the coating liquid for forming the light reflecting layer, drying conditions and the like, is stably and surely provided by the provision of this rectangular part.

These and other objects, features and advantages of the present invention will become more apparent upon a consideration of the following description of a number of embodiments of the present invention, which will be described by way of example only with reference to the accompanying drawings.

DESCRIPTION OF THE PREFERRED EMBODIMENTS

Figure 1:
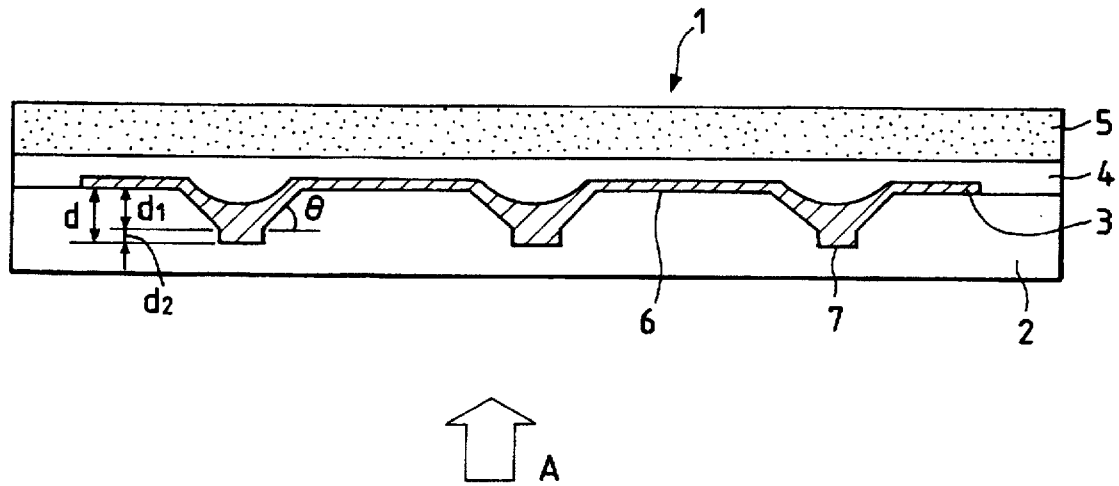
FIG. 1 is a schematic cross-sectional view, in the transverse direction to a track, of an optical recording medium according to an embodiment of the present invention.
Figure 2:
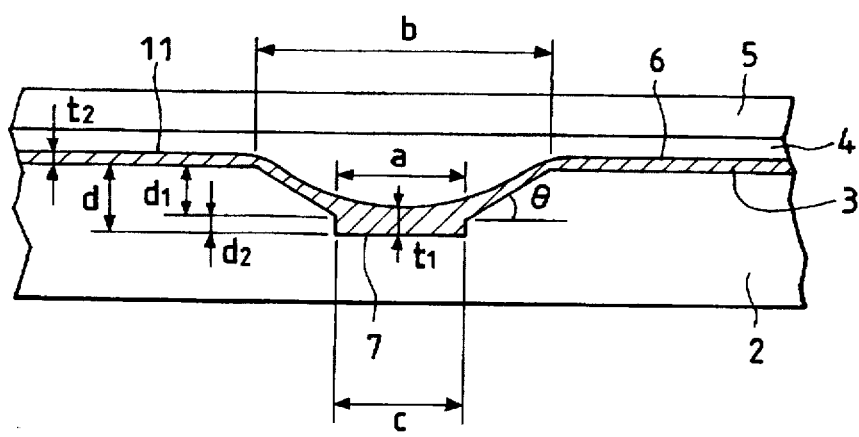
FIG. 2 is a partially enlarged cross-sectional view of the optical recording medium shown in FIG. 1.

FIGS. 1 and 2 are typical cross-sectional views, in the transverse direction to a track, of an optical recording medium according to an embodiment of the present invention. Referring to FIG. 1, reference numerals 1 and 2 indicate an optical recording medium and a transparent substrate, respectively. In the surface of the substrate 2, a preformat comprising concavities, such as tracing tracks 7, etc. is formed. A light reflecting layer 3 is formed by a wet coating method on the surface in which the preformat has been formed, and a protective substrate 5 is laminated on the light reflecting layer 3, and an adhesive layer 4 is provided therebetween. Referring to FIG. 2, the concave tracking track 7 of the optical recording medium 1 has a sectional shape with an open trapezoid having a rectangular or square part (herein after referred to as "rectangular part" simply) in a transverse direction to the track. The trapezoidal part is the so-called reversed trapezoid in which the length (b) of the upper side of a pair of parallel sides for the trapezoidal part is longer than the length (a) of the lower side thereof, and the rectangular part adjoins the lower side of the trapezoidal part. The formation of the concave preformat in such a sectional shape prevents the generation of a W-shaped signal waveform. As a result, signals having high contrast can be obtained, and unevenness of contrast in reproduction signals between the central portion and the peripheral portion of a recording region of the optical recording medium can also be restricted.

In the above embodiment, the shape of the concavity of the preformat is defined by an angle (Θ) formed between a sloping side of the trapezoidal part and a horizontal plane, a depth (d) of the concavity, i.e., a depth (d1) of the trapezoidal part and a depth (d2) of the rectangular part, and a width (b) of the concavity and a width (c) of the rectangular part. The contrast of signals for reproducing the preformat is controlled by these factors. More specifically, the light reflecting layer formed on the sloping sides diffracts an optical radiation beam for reproduction when the optical radiation beam for reproduction crosses the concavity of the preformat. Therefore, the angle (Θ) defines the degree of diffraction. Besides, the depth (d) of the preformat concavity is the sum of the depth (d1) of the trapezoidal part and the depth (d2) of the rectangular part. The depth (d1) controls the film thickness distribution of the light reflecting layer formed at a portion extending from the flat top of a convexity adjacent to the concavity of the preformat to the concavity of the preformat, and in particular, a part of the sloping side, while the depth (d2) controls the film thickness of the light reflecting layer at the bottom of the preformat concavity. Further, the depth (d) of the concavity controls a phase difference given to reflected light of a beam for reproducing the preformat. Furthermore, a ratio (c/b) of the width (c) of the rectangular part to the width (b) of the concavity defines a proportion of a region in which the light reflecting layer shows a minimum reflectance in the concavity of the preformat. This ratio also affects the contrast of signals for reproducing the preformat. Therefore, it is preferred that the values of the angle (Θ), depth (d) and widths (a, b, c) of the concavity be controlled such a change in the reflectance, which is brought about as a result of factors such as the difference in reflectance caused by a difference in film thickness between the concave portion and the convex portion of the light reflecting layer, the phase difference caused by a difference in level between the concavity and the convexity, and the diffraction of light at the sloping side of the concavity, alone or in combination, is as great as possible, and such that the change in the reflectance can be stably caused.

For example, it is preferable from the viewpoint of providing a high-quality optical recording medium for the widths (a, b) of the concavity of the preformat and the width (c) of the rectangular part to satisfy the following conditions. That is, for example, it is preferred that the width (b) of the concavity of the preformat and a spot diameter (Φ) of an optical recording and reproduction generally satisfies the following inequality:

$$0.5 < (b/\Phi) < 1.5.$$

For example, when the spot diameter (Φ) of the optical radiation beam on the recording medium is 3±0.3 μm, a preferable width (b) of the concavity is in the range of from 1.5 to 4.5 μm, particularly, from 1.8 to 3.0 μm. In the case of Φ=1 to 2 μm, a preferable width (b) of the concavity is in the range of from 0.5 to 3.0 μm, and, in particular, from 0.5 to 1.0 μm. The width (c) of the rectangular part of the preformat concavity defines a proportion of a region in which the reflectance is at a minimum in the concavity. This proportion greatly affects the contrast of signals for reproducing the preformat. It also determines whether the reflectance in this region gives a W-shaped signal or not when detecting a signal in the transverse direction to a track A ratio (c/b) of the width (c) to the width (b) is preferably greater than 0 but not greater than 1, more preferably in the range of from 0.14 to 0.96, and most preferably in the range of from 0.2 to 0.9, because the contrast can be made even and improved by such a rectangular part.

The angle (Θ) formed between a sloping side of the trapezoidal part and a horizontal plane of the substrate is preferably greater than 0 but not larger than 60 degrees, more preferably in the range of from 10 to 40 degrees, and most preferably in the range of from 15 to 35 degrees. When the angle (Θ) is controlled within this range, a film having a thickness in which the light reflecting layer shows a minimum reflectance when scanning the preformat with the optical radiation beam can be stably formed in the rectangular part because the optical recording material is reliably filled therein. In addition, the shape of the light reflecting layer formed on the sloping sides of the trapezoidal part can also be adjusted in such a form that the reflectance of the optical radiation beam from the preformat can be steeply lowered. As a result, high contrast can be stably ensured, and an optical radiation beam can be introduced to a track to be accessed more easily.

The optimum depth of the concavity varies according to the kind of the material used for the light reflecting layer, and the viscosity and concentration of the coating liquid used for forming the light reflecting layer, and is not defined unqualifiedly. However, when an optical radiation beam for recording or reproducing is incident on the light reflecting layer through the substrate, it is preferable to make the depth greater than at least λ/4n, wherein λ denotes a wavelength of the optical radiation beam for recording or reproducing, and n denotes a refractive index of the substrate. When the concavity is made to have such a depth, signals for reproducing the preformat show excellent contrast. The reason for this is not clearly understood. However, it is believed to be attributed to the fact that the information of a difference in reflectance between the convex portion and the concave portion of the light reflecting layer and a phase difference caused by this setting of the depth act synergistically.

The depth (d2) of the rectangular part of the preformat concavity varies according to the angle (Θ) of the sloping side of the trapezoidal part. For example, in the case where the angle (Θ) is in the range of from 15 to 60 degrees, more preferably from 15 to 40 degrees, and most preferably from 15 to 35 degrees, the contrast can be improved by presetting the depth (d2) of a range of from 5 to 80 nm, from 8 to 60 nm, and from 8 to 40 nm, respectively.

Specific examples according to this embodiment now will be described.

Figure 3:
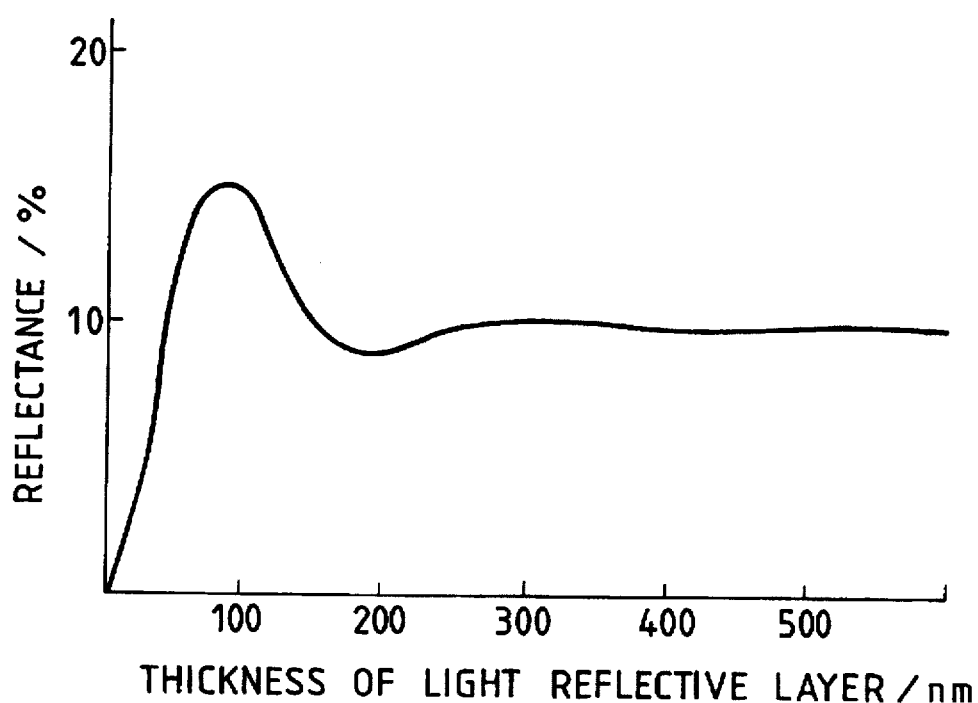
FIG. 3 illustrates the relationship between the film thickness and reflectance of a material for a light reflecting layer in Example 1.

For example, a polymethine dye represented by the following formula [1] has a refractive index (n) of 2.1 and an extinction coefficient (k) of 1.0, and the dependence of refractive index on film thickness is as illustrated in FIG. 3.

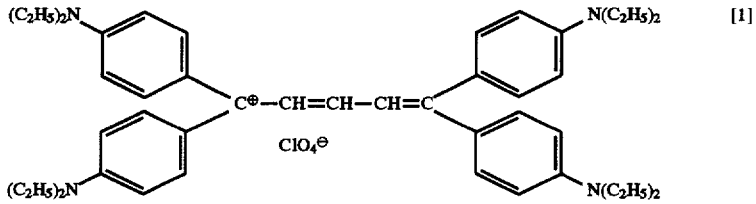

When this polymethine dye is used in a material for a light reflecting layer, and an optical radiation beam having λ of 830 nm and a bisphenol A type polycarbonate substrate is employed, it is preferred that the thickness (t2) of a light reflecting layer at convexities of a preformat is a thickness showing a maximum reflectance, specifically, about 90±10 nm. It is also preferred that the thickness (t1) of a light reflecting layer at a concavity is such a thickness that a difference in reflectance from the preformat convexity is as great as possible, i.e., a thickness showing substantially a minimum reflectance. In the case where the thickness (t1) is 180 to 200 nm or greater, excellent contrast is expected. If the width (b) of the concavity of the preformat is 3 μm, the widths (a) and (c) of the concavity are 1.13 μm, the depth (d) of the concavity is greater than λ/4n, i.e., 200 to 300 nm, further preferably 230 to 270 nm, and most preferably 250 to 270 nm, and preferably where d1=250 nm and d2=10 nm, and the angle (Θ) is 15 degrees, the thickness (t1) of the light reflecting layer at the concavity can be adjusted to the above range when the viscosity of a coating liquid for forming the light reflecting layer is 8 cP. Thus, an even and excellent contrast, for example, a contrast of about 0.4 to 0.5 actually can be obtained.

Figure 4:
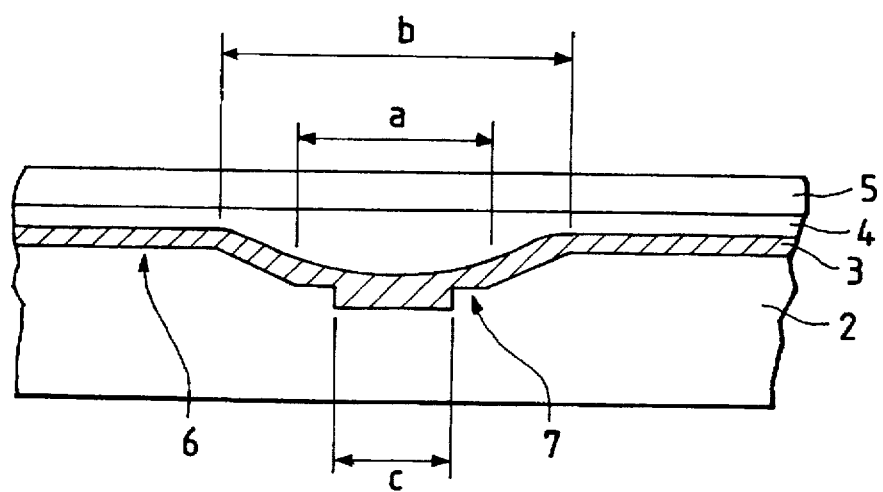
FIG. 4 is a schematic cross-sectional view, in the transverse direction to a track, of an optical recording medium according to another embodiment of the present invention.
Figure 5A:
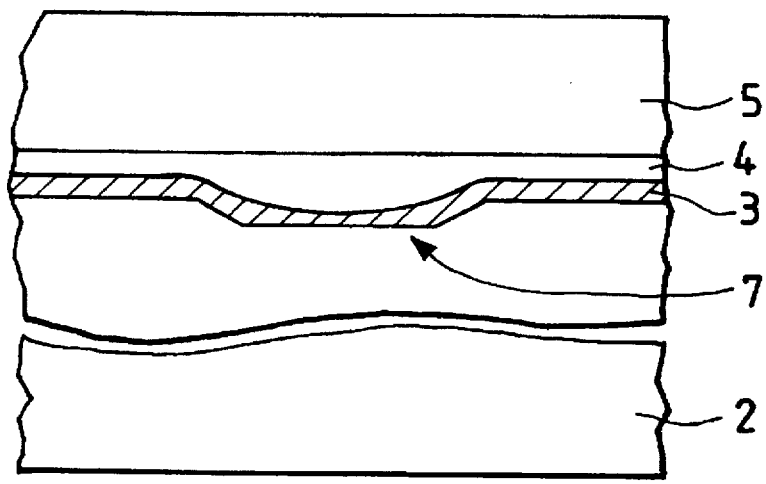
FIG. 5A is a schematic cross-sectional view, in the transverse direction to a track, of an optical recording medium of the prior art.
Figure 5B:
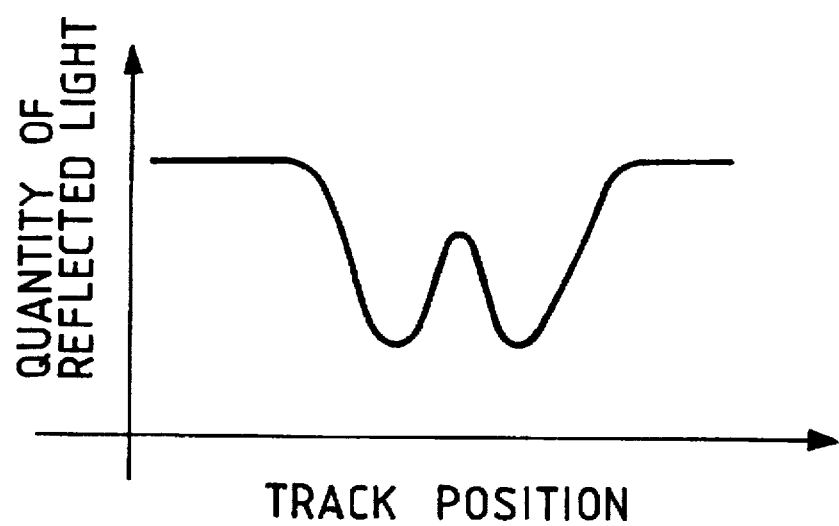
FIG. 5B illustrates the waveform of a signal, in the transverse direction to the track, of the optical recording medium shown in FIG. 5A.

In FIGS. 1 and 2, an embodiment in which the width (a) of the lower side of the trapezoidal part is equal to the width (c) of the rectangular part has been illustrated. However, the present invention is not limited to such an embodiment, and, for example, an embodiment as illustrated in FIG. 4 may be used.

In the above embodiment, the sectional shape of the preformat in a direction transverse to the track has been described. However, for example, when prepits are provided in a recording track, it is preferred that the prepits also have a sectional shape of an open trapezoid having a rectangular part in the direction along the track. This trapezoidal part is the so-called reversed trapezoid that the length (b) of the upper side of a pair of parallel sides making up the trapezoidal part is longer than the length (a) of the lower side thereof, and the rectangular part adjoins the lower side of the trapezoidal part.

As a process for producing a substrate for such an information recording medium, there may be used a process as described in U.S. Pat. No. 5,234,633, in which metal films different in etching rate are laminated on each other, these metal films are etched to form a mold having a convexity corresponding to the concavity having the trapezoidal part and the rectangular part, and this mold is used to produce the substrate for an information recording medium as described above.

Examples of a method for molding this substrate including injection molding, compression molding, cast molding and a 2P method using a photocurable resin. For example, if an optical radiation beam is transmitted through the substrate, a material for the substrate is preferably transparent to the optical radiation beam. Examples of such a material include glass, ceramics, acrylic resins, polystyrene and polycarbonate resins.

A light reflecting layer 3 is then formed by the wet coating method on a substrate in which a preformat having the above-described shape has been formed. As illustrated in FIG. 1, the light reflecting layer 3 is continuously formed from the top surfaces of the convexities 6 to the bottom of the concavity though the sloping sides of the concavity. In the above-described embodiments, the light reflecting layer can be continuously formed on the surfaces of the substrates each having the preformat by application of a coating liquid.

This light reflecting layer is required to have a predetermined reflectance in order to reliably read out the information of the preformat formed in the substrate. The value is determined in relation to its reproducing ability. In order to effect high-precision reproduction without being affected by dirt and flaws on the surface of the substrate, however, it requires a reflectance of 12% or higher for at least a recording track portion thereof.

A material for such a light reflecting layer varies according to the type of the information recording medium according to the represent invention, i.e., whether the recording medium is of:

(1) a ROM type in which an information preformed such as a preformat in a substrate is only read out, or (2) the additionally recordable type in which new information can be additionally recorded in the medium by use of tracking tracks, address pits and the like preformed as a preformat in a substrate. In each case, the light reflecting layer formed on the concave and convex preformat by the application of the coating liquid may preferably change its reflectance according to the thickness of the layer.

In the case of the former ROM type, a dispersion of fine particles of a metal in a binder or a heat-resistant dye or pigment is used. In the case of the latter type, a material having both properties of absorption giving recording sensitivity and reflection determining the contrast of reproduction signals against an optical radiation beam for recording and reproduction is preferred. Dyes, pigments, and the like conventionally known as optical recording materials, for example, cyanine, squalium, phthalocyanine, tetradehydrocholine, polymethine, and naphthoquinone dyes and pigments and organometallic complexes such as benzenedithiol nickel, may preferably be used.

In the case of the latter type, a light reflecting layer may also be provided on only the preformat part by the coating method, and another recording medium, for example, a deposited film of a metal, may be provided on the residual additional writing part.

An organic solvent usable on the application of the light reflecting layer varies according to whether a coloring matter is dispersed or dissolved in the solvent. However, examples thereof include alcohols such as methanol, ethanol, isopropanol and diacetone alcohol, ketones such as acetone, methyl ethyl ketone and cyclohexanone, and other solvent such as amides, ethers, esters, halogenated aliphatic hydrocarbons, aromatics and aliphatic hydrocarbons. The alcohol solvents are particularly preferred because they do not attack the substrate upon the application of the light reflecting layer.

When the light reflecting layer is provided by a wet coating method on a substrate provided with a concave preformat, a solution or dispersion of a material for making the light reflecting layer is coated by a method such as roll coating, Meyer bar coating, air-knife coating, calendar coating, dip coating or spraying. For the coating liquid used for the light reflecting layer in this case, its solubility is determined by the coloring matter and solvent used. Therefore, the solid concentration and viscosity of the coating liquid, which are required to provide a thickness giving a maximum reflectance to the light reflecting layer, are determined on the basis of this solubility.

For example, when a coloring matter such as represented by the above structural formula [1] or a structural formula [2] which will be described subsequently and a diacetone alcohol as a solvent are used, the concentration of the coloring matter is preferably 1 to 5% by weight, and more preferably 2 to 4% by weight, and the viscosity is preferably 2 to 20 cP, and more preferably 2 to 8 cP.

When the shape of the concavity of the preformat is adjusted to such a form as has been described in this embodiment, signals that are even and excellent in contrast for reproducing the preformat can be provided without strictly controlling the drying of the light reflecting layer formed by a wet coating method. The conditions for drying may be controlled. For example, as conditions for drying the coating film, it is preferred that the process in which the coating film be leveled while the solvent of the coating liquid is being evaporated is controlled to uniformly form the coating film on the concavity of the preformat. More specifically, for example, clean air of room temperature is moderately blown onto the coated surface to dry the coating film. In this case, the flow rate of the clean air is preferably in the range of from 1 to 5 m/min, and most preferably from 2.5 to 3.5 m/min, and the drying time is preferably in the range of from 10 seconds to 2 minutes, and more preferably from 20 to 40 seconds.

The transparent substrate on which the light reflecting layer has been formed in the above-described manner is laminated with a protective member, for example, through an adhesive.

In the present invention, as the adhesive layer 4, any conventional adhesive may be used, for example, a polymer or copolymer of a vinyl monomer such as vinyl acetate, acrylic ester, vinyl chloride, ethylene, acrylic acid or acrylamide, a thermoplastic adhesive such as polyamide, polyester or polyether, a thermosetting adhesive such as an amino resin (urea resin, melamine resin), phenolic resin, epoxy resin, urethane resin or thermosetting vinyl resin, or a rubber adhesive such as natural rubber, nitrile rubber, chloroprene rubber, or silicone rubber. A hot-melt adhesive is particularly preferred from the viewpoint of mass or series production because it is a dry process.

The protective substrate 5 serves to mechanically protect the recording layer 3, and a plastic, metal, ceramic or glass sheet or plate, paper, or a composite material thereof may be used. As for the protective substrate itself, any material may be used irrespective of its transparent or opaque properties, so long as it can satisfy the above goals.

Such a material is rather determined by the system for reading optical information. In the case of a transmission type reading system, it must be transparent, and the requirement for birefringence is also the same as that for the substrate. Therefore, the materials are naturally limited.

In the case of a reflection type reading system, the protective substrate may be opaque, and so its material can be selected from materials of a wide range. This protective substrate may be optically closely laminated directly on the optical recording layer 3. Besides, the so-called air-gap structure in which the protective substrate is provided so as to be an air layer between the light reflecting layer and the protective substrate may be used as needed.

According to the embodiments as described above, the following excellent effects can be obtained.

(1) Even when the light reflecting layer is formed by means of a wet coating method, the pattern (or waveform) of the quantity of reflected light scarcely becomes a W shape upon reproduction of the preformat in the resulting optical recording medium, and so the optical recording medium can be provided as a recording medium which can provide signals having high contrast.

(2) When the light reflecting layer is formed by a wet coating method, scattering of contrast in reproduction signals of the preformat between the central portion and peripheral portion of its recording region can be reduced.

(3) Since there is no need for strictly controlling the physical properties of the coating liquid for forming the light reflecting layer and the conditions for drying the coating film, a high-quality optical recording medium can be provided at low cost.

The embodiments of the present invention will hereinafter be described in more detail by the following examples. However, the present invention is not limited to or by these examples.

In each of these examples, the sectional shape of a preformat and the thickness of a recording layer were measured and calculated from a photograph obtained by cutting the optical recording medium produced in the transverse direction to its track and taking a shot of its section by using a scanning electron microscope (trade name: S-570 Model; manufactured by Hitachi Ltd.; 3,000 magnifications). The measurement of reproduction signals of the preformat was conducted by means of an optical card recording and reproducing apparatus (manufactured by Canon Inc.). An optical system for reproduction in this apparatus uses a semiconductor laser of 830 nm in wavelength, in which an optical radiation beam is stopped to a spot of 3 μm in diameter at the plane of incidence of the medium.

EXAMPLE 1

Figure 8:
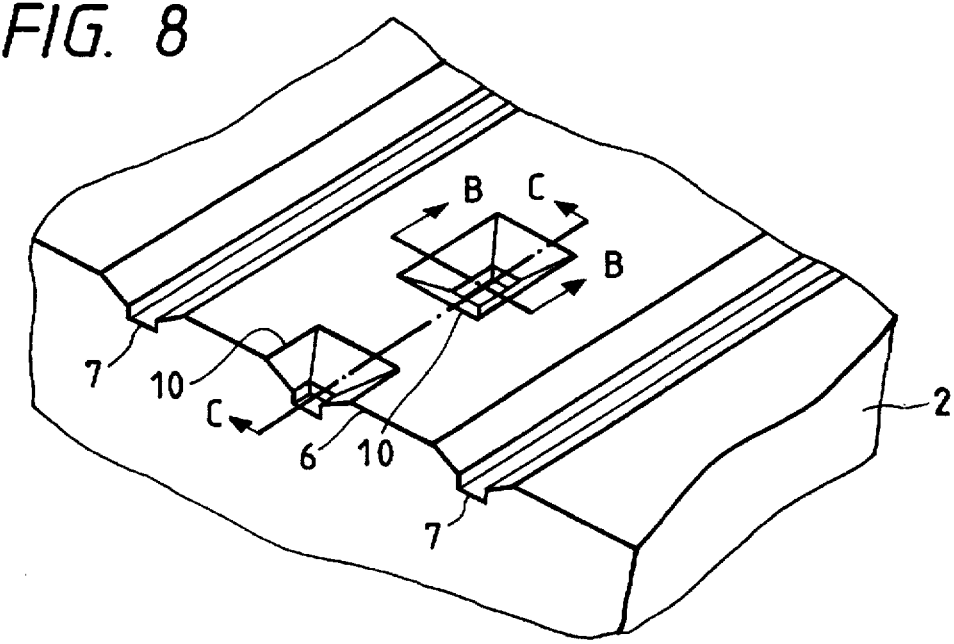
FIG. 8 is a perspective view of a substrate for an optical recording medium according to an embodiment of the present invention.
Figure 9A:
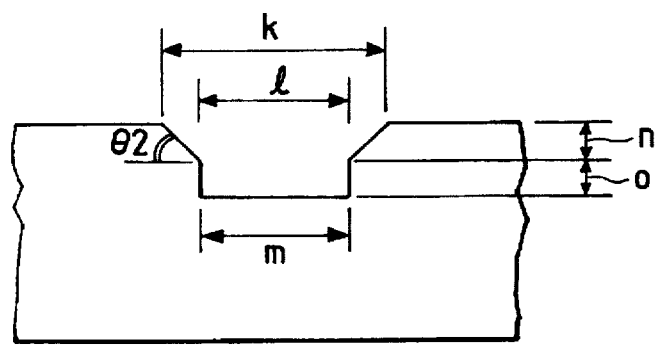
FIG. 9A is a cross-sectional view taken on line B—B of FIG. 8.
Figure 9B:
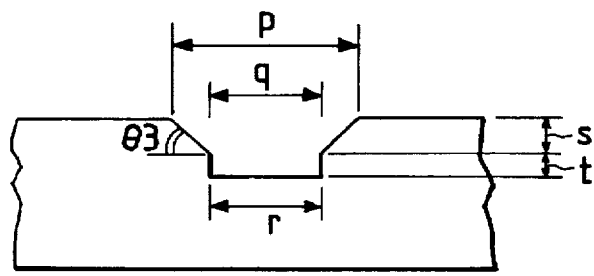
FIG. 9B is a cross-sectional view taken on line C—C of FIG. 8.

A polymethyl methacrylate substrate (n=1.49) of 10 cm long×10 cm wide×0.4 mm thick was used as a transparent substrate, and a preformat was formed in the surface of the substrate by hot pressing, thereby producing a substrate as illustrated in FIG. 8. A preformat comprising tracking grooves formed in a width of 3 μm at a pitch of 12 μm and prepits formed in convex portions adjacent to the tracking grooves was formed. The sectional shape of each of the tracking grooves in the direction transverse to the track was as illustrated in FIG. 2. Its respective dimensions were as follows: b=3 μm, a=c=2.84 μm, depth (d1)=140 nm, depth (d2)=40 nm and angle (Θ)=60°. The sectional shapes of each of the prepits in the direction transverse to and in a direction along the track were as illustrated in FIGS. 9A and 9B, respectively. Respective dimensions were as follows: Θ2=55°, k=2.5 μm, l=2.4 μm, m=2.3 μm, n=140 nm and o=40 nm. In FIG. 9B, respective dimensions were as follows: Θ3=50°, p=3 μm, q=2.8 μm, r=2.76 μm, s=140 nm and t=40 nm.

A mold imparting these tracking grooves was produced in accordance with the method described in Japanese Patent Application Laid-Open No. 5-114173.

A solution (3% by weight) of a polymethine dye represented by the structural formula [1] in diacetone alcohol was applied to the surface of this substrate by a roll coater, and diacetone alcohol was then vaporized to form a light reflecting layer 3. Drying was effected under conditions that clean air of 23° C. was blown onto the light reflecting layer-formed surface of the substrate for 20 seconds at a flow rate of 3 m/min.

A polymethyl methacrylate protective substrate of 10 cm long×10 cm wide×0.35 mm thick was laminated on the light reflecting layer through a hot-melt adhesive sheet containing an ethylene-vinyl acetate copolymer to fabricate an optical card of a work size. A piece having a size of 85.6 mm in length (y) and 54 mm in width (x) was then punched out of the work-sized card, thereby obtaining an optical card.

Figure 6:
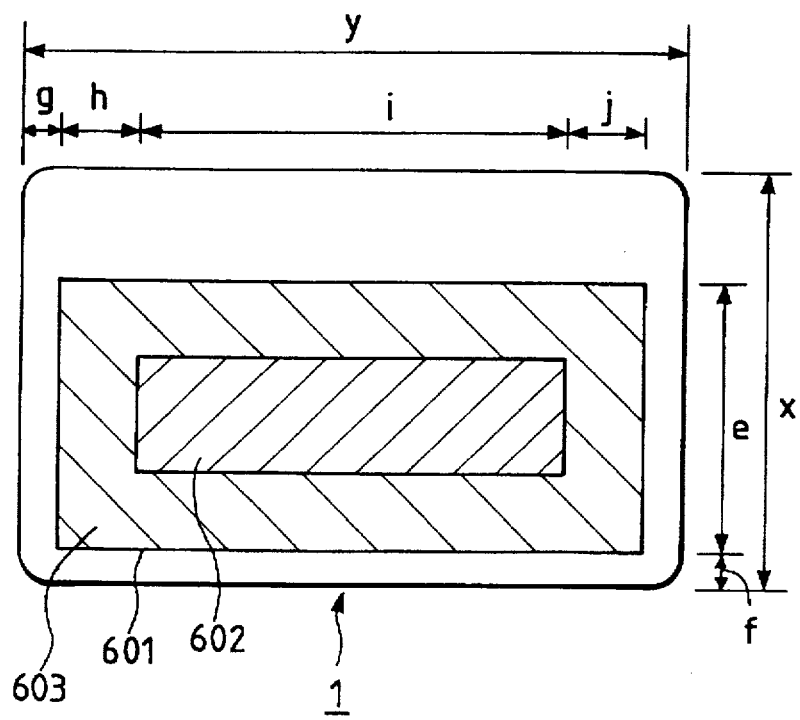
FIG. 6 illustrates the central portion and peripheral portion of a recording region of an optical card according to Example 1.

This optical card was put in the optical card recording and reproducing apparatus to measure the contrast of signals in the direction transverse to the track, and moreover to observe the waveforms of these signals. The measurement of the signals in the direction transverse to the track was conducted at 12 positions in the central portion (602) and 36 positions in the peripheral portion (603) of a recording region illustrated in FIG. 6 to calculate a proportion of a standard deviation to the average value of the resultant data, thereby evaluating the evenness in the formation condition of the light reflecting layer. The respective dimensions in FIG. 6 were as follows: e=34 mm, f=4.5 mm, g=3 mm, h=15 mm, i=50 mm and j=15 mm. The results of the measurements are shown in Table 1.

A new optical card was produced in exactly the same manner as described above. This card was used in measuring the thickness of the recording layer at the central portion of the recording region. As a result, a thickness (t2) at the convex part of the substrate was 100 nm, in which the polymethine dye shows a maximum reflectance, while a thickness (t1) at the concave part was 180 nm, in which the polymethine dye shows substantially a minimum reflectance.

EXAMPLES 2 TO 9

Optical cards were produced in the same manner as in Example 1 except that the sectional shape of each tracking groove in Example 1 was changed to achieve corresponding shapes shown in Table 1, and then evaluated.

Comparative Examples 1 to 5

Five optical cards were produced in the same manner as in Examples 2, 4, 5, 7, and 9, respectively, except that no rectangular part was provided at their corresponding tracking grooves, and then evaluated.

The results of the evaluation in Examples 1 to 9 and Comparative Examples 1 to 5 are shown in Table 1. The evaluation standards in Table 1 are as follows:

Evaluation standards

Figure 7:
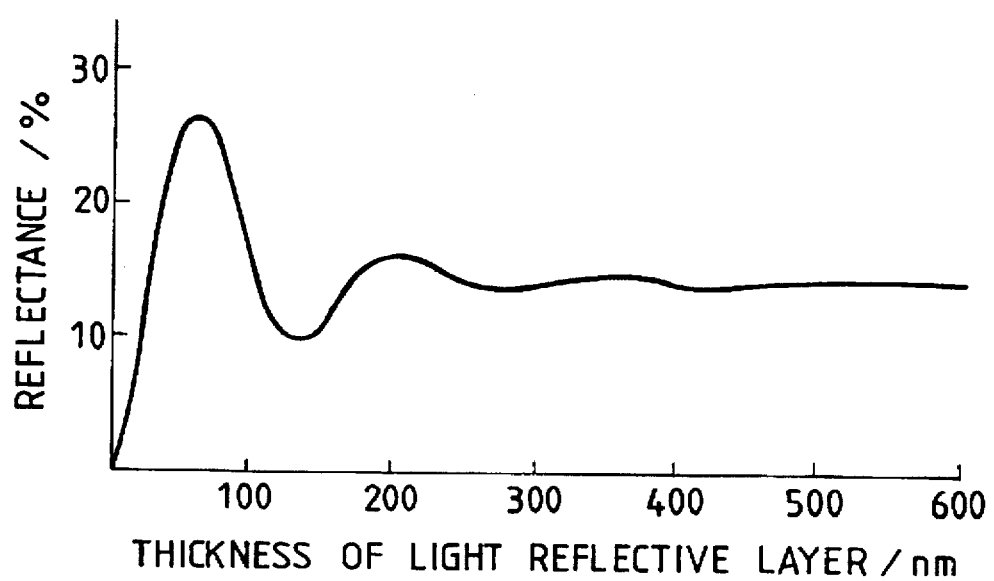
FIG. 7 illustrates the relationship between the film thickness and reflectance of a material for a light reflecting layer in Example 13.

A: A proportion (Y) of the standard deviation to the average value of the signals in the direction transverse to the track was not higher than 1.5%;

B: Y is higher than 1.5% but not higher than 3.5%;

C: Y is higher than 3.5% but not higher than 5.5%;

D: Y is higher than 5.5%.

illustrated in FIG. 7. That is, a maximum value, 26%, of reflectance is obtained when the thickness is about 60 to 70 nm, while a minimum value, 10%, of reflectance is obtained when the thickness is about 130 to 140 nm. Further, a substantially constant reflectance of 14% is obtained when the thickness is 300 nm or greater. In this example, the sectional shape of each of the tracking grooves in the direction transverse to the track was as illustrated in FIG. 2. In FIG. 2, respective dimensions were as follows: b=3 µm, a=c=2.84 µm, depth (d1)=140 nm, depth (d2)=40 nm and angle ($\Theta$)=60.

A coating solution for forming the light reflecting layer used in this example was a solution obtained by dissolving 3% by weight of the above organic coloring matter in diacetone alcohol. After applying the coating liquid to the surface of the substrate, clean air of 23° C. was blown onto the coated surface for 30 seconds at a flow rate of 3.5 m/min to dry the light reflecting layer. Other procedures were carried out in the same manner as in Example 1 to produce an optical card and evaluate it. The results are shown in Table 2.

TABLE 1

| Example | b µm | c µm | a µm | $\Theta$ deg. | d1 nm | d2 nm | t1 nm | t2 nm | CONTRAST | EVALUATION |
|---|---|---|---|---|---|---|---|---|---|---|
| Example 1 | 3.0 | 2.84 | 2.84 | 60 | 140 | 40 | 180 | 100 | 0.22–0.29 | C |
| Example 2 | 3.0 | 2.71 | 2.71 | 60 | 250 | 20 | 190 | 100 | 0.24–0.31 | B |
| Co-Ex. 1 | 3.0 | — | 2.71 | 60 | 250 | — | 180 | 100 | 0.22–0.28 | D |
| Example 3 | 3.0 | 2.67 | 2.67 | 60 | 140 | 20 | 180 | 100 | 0.23–0.29 | A |
| Example 4 | 3.0 | 2.40 | 2.40 | 40 | 250 | 10 | 180 | 100 | 0.25–0.31 | A |
| Co-Ex. 2 | 3.0 | — | 2.40 | 40 | 250 | — | 180 | 100 | 0.22–0.29 | D |
| Example 5 | 3.0 | 2.40 | 2.40 | 25 | 140 | 20 | 180 | 100 | 0.38–0.42 | A |
| Co-Ex. 3 | 3.0 | — | 2.40 | 25 | 140 | — | 100 | 80 | 0.25–0.31 | D |
| Example 6 | 3.0 | 2.14 | 2.14 | 25 | 200 | 10 | 180 | 100 | 0.40–0.45 | A |
| Example 7 | 3.0 | 1.90 | 1.90 | 25 | 250 | 10 | 180 | 100 | 0.43–0.47 | A |
| Co-Ex. 4 | 3.0 | — | 1.90 | 25 | 250 | — | 180 | 100 | 0.38–0.42 | D |
| Example 8 | 3.0 | 1.95 | 1.95 | 15 | 140 | 20 | 180 | 100 | 0.43–0.46 | A |
| Example 9 | 3.0 | 1.13 | 1.13 | 15 | 250 | 10 | 180 | 100 | 0.45–0.48 | A |
| CO-Ex. 5 | 3.0 | — | 1.13 | 15 | 250 | — | 180 | 100 | 0.43–0.45 | D |
| Example 10 | 3.0 | 0.45 | 1.13 | 15 | 250 | 10 | 180 | 100 | 0.44–0.47 | A |
| Example 11 | 3.0 | 0.21 | 1.13 | 15 | 250 | 10 | 180 | 100 | 0.44–0.46 | A |
| Example 12 | 3.0 | 0.16 | 0.16 | 10 | 250 | 10 | 180 | 100 | 0.46–0.50 | C |

EXAMPLE 13

A coloring matter represented by the following structural formula [2] was used as a material for a light reflecting layer to produce an optical card.

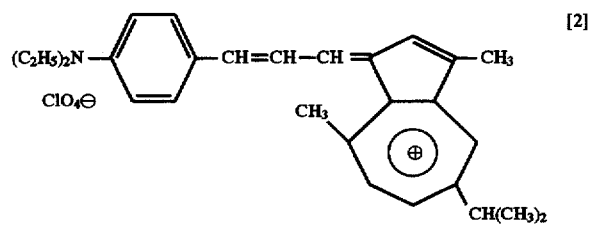

[2]

The organic coloring matter represented by the structural formula [2] has a refractive index (n) of 3.0 and an extinction coefficient (k) of 0.8, and the relationship between thickness and refractive index when formed in a thin film is as

EXAMPLES 14 TO 20

Six optical cards were produced in the same manner as in Example 13 except that the sectional shape of each tracking groove in Example 13 was changed to corresponding shapes shown in Table 2 to evaluate them. The results of the evaluations are shown in Table 2.

Comparative Examples 6 to 9

Four optical cards were produced in the same manner as in Example 13 except that the shape of the tracking groove in Example 13 was changed to corresponding shapes provided with no rectangular part, as shown in Table 2, to evaluate them. The results of the evaluations are shown in Table 2.

TABLE 2

| Example | b μm | c μm | a μm | Θ deg. | d1 nm | d2 nm | t1 nm | t2 nm | CONTRAST | EVALUATION |
|---|---|---|---|---|---|---|---|---|---|---|
| Example 13 | 3.0 | 2.84 | 2.84 | 60 | 140 | 40 | 130 | 60 | 0.22–0.28 | B |
| Example 14 | 3.0 | 2.67 | 2.67 | 40 | 140 | 20 | 130 | 60 | 0.23–0.30 | A |
| Example 15 | 3.0 | 2.40 | 2.40 | 25 | 140 | 20 | 130 | 60 | 0.39–0.40 | A |
| Example 16 | 3.0 | 2.14 | 2.14 | 25 | 200 | 10 | 130 | 60 | 0.41–0.45 | A |
| Co-Ex. 6 | 3.0 | — | 2.14 | 25 | 200 | — | 120 | 60 | 0.36–0.40 | D |
| Example 17 | 3.0 | 1.71 | 1.71 | 25 | 300 | 10 | 140 | 60 | 0.43–0.47 | A |
| Co-Ex. 7 | 3.0 | — | 1.71 | 25 | 300 | — | 130 | 60 | 0.41–0.45 | D |
| Example 18 | 3.0 | 1.95 | 1.95 | 15 | 140 | 20 | 130 | 60 | 0.43–0.48 | A |
| Example 19 | 3.0 | 0.76 | 0.76 | 15 | 300 | 10 | 140 | 60 | 0.45–0.49 | A |
| Co-Ex. 8 | 3.0 | — | 0.76 | 15 | 300 | — | 130 | 60 | 0.43–0.47 | D |
| Co-Ex. 9 | 3.0 | — | 2.28 | 40 | 300 | — | 130 | 6D | 0.21–0.27 | D |
| Example 20 | 3.0 | 1.41 | 1.41 | 10 | 140 | 20 | 130 | 60 | 0.45–0.50 | B |
| Example 21 | 3.0 | 0.45 | 0.76 | 15 | 300 | 10 | 140 | 60 | 0.44–0.48 | B |

As is apparent from Tables 1 and 2, according to the disclosed embodiments of the present invention, thee is provided an optical card capable of obtaining signals in the direction transverse to the track, which are even and excellent in contrast, over the entire recording region.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information recording medium to be illuminated with an optical radiation beam, comprising: a substrate having a surface provided with a preformat comprising a servo track and forming a sectional shape, in transverse to the track, which comprises a concavity provided between two convexities, each having a flat top, and a light reflecting layer being formed by application of a coating liquid over the surface of the substrate, wherein the concavity has the sectional shape of an open trapezoid having a rectangular part, the trapezoidal part has a pair of parallel opposite sides and a pair of sloping sides constituting walls of the trapezoidal part, one of the parallel sides constituting the bottom of the trapezoidal part being shorter than the opposite side, and the rectangular part is adjacent to the side constituting the bottom of the trapezoidal part.

2. The medium according to claim 1, wherein said light-reflecting layer has a larger thickness at the concavity than at the convexity of the substrate.

3. The medium according to claim 2, wherein the light-reflecting layer has a thickness showing substantially the maximum reflectance at the convexities and a thickness showing substantially the minimum reflectance at the concavity.

4. The medium according to claim 1, wherein the concavity has a predetermined width (b) in transverse to the track and the rectangular part has a width (c) in transverse to the track, and a ratio of the widths (c/b) is greater than 0 but not larger than 1.

5. The medium according to claim 4, wherein the predetermined width (b) satisfies the following inequality:

$$0.5 < (b/\phi) < 1.5$$

wherein $\phi$ denotes a diameter of the optical radiation beam.

6. The medium according to claim 4, wherein said ratio is in the range of 0.14 to 0.96.

7. The medium according to claim 6, wherein said ratio is in the range of 0.2 to 0.9.

8. The medium according to claim 1, wherein the light-reflecting layer contains organic colouring matter.

9. The medium according to claim 8, wherein the organic colouring matter is a polymethine dye.

10. The medium according to claim 9, wherein the polymethine dye is 1,1,5,5-tetrakis(p-diethylaminophenyl) pentadienium perchlorate.

11. The medium according to claim 1, wherein an angle (Θ) formed between each of the sloping sides and the extension of the surface of the substrate is greater than 0 but not larger than 60 degrees.

12. The medium according to claim 11, wherein the angle (Θ) is in the range of 10 to 40 degrees.

13. The medium according to claim 12, wherein the angle (Θ) is in the range of 15 to 35 degrees.

14. The medium according to claim 1, wherein the concavity of the preformat has a depth (d) larger than $\lambda/4n$, wherein $\lambda$ denotes the wavelength of the optical radiation beam and n denotes the refractive index of the substrate.

15. The medium according to claim 14, wherein the rectangular part of the concavity has a depth (d2) in the range of 5 to 80 nm.

16. The medium according to claim 15, wherein the depth (d2) is in the range of 8 to 60 nm.

17. An information recording-reproducing method, comprising illuminating an information recording medium with an optical radiation beam having a wavelength $\lambda$ to effect recording or reproduction of information; said information recording medium comprising: a substrate having a surface provided with a preformat comprising a track and forming a sectional shape, in transverse to the track, which comprises a concavity provided between two convexities, each having a flat top, and a light reflecting layer being formed by application of a coating liquid over the surface of the substrate, wherein the concavity has the sectional shape of an open trapezoid having a rectangular part, the trapezoidal part has a pair of parallel opposite sides and a pair of sloping sides constituting walls of the trapezoidal part, one of the parallel sides constituting the bottom of the trapezoidal part being shorter than the opposite side, and the rectangular part is adjacent to the side constituting the bottom of the trapezoidal part.

18. The method according to claim 17, wherein said light-reflecting layer of the information recording medium to be recorded on or to be reproduced, has a larger thickness at the concavity than at the convexity of the substrate.

19. The method according to claim 17, wherein the light-reflecting layer has a thickness showing substantially the maximum reflectance at the convexities and a thickness showing substantially the minimum reflectance at the concavity.

20. The method according to claim 17, wherein the concavity has a predetermined width (b) in transverse to the track and the rectangular part has a width (c) in transverse to the track, and a ratio of the widths (c/b) is greater than 0 but not larger than 1.

21. The method according to claim 20, wherein the predetermined width (b) satisfies the following inequality:

$$0.5 < (b/\phi) < 1.5$$

wherein $\phi$ denotes a diameter of the optical radiation beam.

22. The method according to claim 20, wherein said ratio is in the range of 0.14 to 0.96.

23. The method according to claim 22, wherein said ratio is in the range of 0.2 to 0.9.

24. The method according to claim 17, wherein the light-reflecting layer contains organic colouring matter.

25. The method according to claim 24, wherein the organic colouring matter is polymethine dye.

26. The method according to claim 25, wherein the polymethine dye is 1,1,5,5-tetrakis(p-diethylaminophenyl)pentadienium perchlorate.

27. The method according to claim 17, wherein an angle ($\Theta$) formed between each of the sloping sides and the extension of the surface of the substrate is greater than 0 but not larger than 60 degrees.

28. The method according to claim 27, wherein the angle ($\Theta$) is in the range of 10 to 40 degrees.

29. The method according to claim 28, wherein the angle ($\Theta$) is in the range of 15 to 35 degrees.

30. The method according to claim 17, wherein the concavity of the preformat has a depth (d) larger than $\lambda/4n$, wherein $\lambda$ denotes the wavelength of the optical radiation beam and n denotes the refractive index of the substrate.

31. The method according to claim 30, wherein the rectangular part of the concavity has a depth (d2) in the range of 5 to 80 nm.

32. The method according to claim 31, wherein the depth (d2) is in the range of 8 to 60 nm.

33. An information recording medium to be illuminated with an optical radiation beam, comprising: a substrate having a surface provided with tracking grooves, the tracking grooves being separated from each other by a recording track which has a flat surface, and a light reflecting layer formed by application of a coating liquid over the surface of the substrate, wherein each tracking groove has a sectional shape, in transverse to the tracking groove direction, of an open trapezoid having a rectangular part, the trapezoidal part has a pair of parallel opposite sides and a pair of sloping sides constituting walls of the groove, one of the parallel sides constituting the bottom of the trapezoidal part being shorter than the opposite side, and the rectangular part is adjacent to the side constituting the bottom of the trapezoidal part.

34. The medium according to claim 33, wherein said light-reflecting layer has a larger thickness at the concavity than at the convexity of the substrate.

35. The medium according to claim 33, wherein the light-reflecting layer has a thickness showing substantially the maximum reflectance at the convexities and a thickness showing substantially the minimum reflectance at the concavity.

36. The medium according to claim 33, wherein the concavity has a predetermined width (b) in transverse to the track and the rectangular part has a width (c) in transverse to the track, and a ratio of the widths (c/b) is greater than 0 but not larger than 1.

37. The medium according to claim 36, wherein the predetermined width (b) satisfies the following inequality:

$$0.5 < (b/\phi) < 0.5$$

wherein $\phi$ denotes a diameter of the optical radiation beam.

38. The medium according to claim 36, wherein said ratio is in the range of 0.14 to 0.96.

39. The medium according to claim 38, wherein said ratio is in the range of 0.2 to 0.9.

40. The medium according to claim 33, wherein the light-reflecting layer contains organic colouring matter.

41. The medium according to claim 40, wherein the organic colouring matter is polymethine dye.

42. The medium according to claim 41, wherein the polymethine dye is 1,1,5,5-tetrakis(p-diethylaminophenyl)pentadienium perchlorate.

43. The medium according to claim 33, wherein an angle ($\Theta$) formed between each of the sloping sides and the extension of the surface of the substrate is greater than 0 but not larger than 60 degrees.

44. The medium according to claim 43, wherein the angle ($\Theta$) is in the range of 10 to 40 degrees.

45. The medium according to claim 44, wherein the angle ($\Theta$) is in the range of 15 to 35 degrees.

46. The medium according to claim 33, wherein the concavity of the preformat has a depth (d) larger than $\lambda/4n$, wherein $\lambda$ denotes the wavelength of the optical radiation beam and n denotes the refractive index of the substrate.

47. The medium according to claim 46, wherein the rectangular part of the concavity has a depth (d2) in the range of 5 to 80 nm.

48. The medium according to claim 47, wherein the depth (d2) is in the range of 8 to 60 nm.

49. The medium according to claim 33, wherein the track is provided so as to elongate to the longitudinal direction.

50. The medium according to claim 49, wherein the medium is an optical card.

* * * * *

UNITED STATES PATENT AND TRADEMARK OFFICE
CERTIFICATE OF CORRECTION

PATENT NO. : 5,682,375
DATED : October 28, 1997
INVENTOR(S) : Hiroyuki IMATAKI

It is certified that error appears in the above-identified patent and that said Letters Patent is hereby corrected as shown below:

On the title page:

Item [57] Abstract:

Line 1, "Disclosed herein is an" should read --An--.
Line 2, "beam, comprising" should read --beam comprises--.
Line 4, "in"should be deleted.

Column 1:

Line 20, "media," should read --medium,--.
Line 27, "media" should read --medium--.

Column 3:

Line 12, "grooves" should read --groove--.
Line 22, "ar." should read --art.--.

Column 8:

Line 23, "solvent" should read --solvents--.

Column 13:

Table 2, in Co.-Ex. 9, column t2, "6D" should read --60--.

UNITED STATES PATENT AND TRADEMARK OFFICE
CERTIFICATE OF CORRECTION

PATENT NO. : 5,682,375
DATED : October 28, 1997
INVENTOR(S) : Hiroyuki IMATAKI

It is certified that error appears in the above-identified patent and that said Letters Patent is hereby corrected as shown below:

Column 14:

Line 24, "colouring" should read --coloring--.
    Line 26, "colouring" should read --coloring--.

Column 15:

Line 22, "colouring" should read --coloring--.
    Line 24, "colouring" should read --coloring--.

Column 16:

Line 21, "$0.5 < (b/\phi) < 0.5$" should read --$0.5 < (b/\phi) < 1.5$--,
    Line 28, "colouring" should read --coloring--.
    Line 30, "colouring" should read --coloring--.

Signed and Sealed this

Twenty-eighth Day of July, 1998

Attest:

BRUCE LEHMAN

*Attesting Officer*      *Commissioner of Patents and Trademarks*